US010789653B1

(12) United States Patent
Davis et al.

(10) Patent No.: US 10,789,653 B1
(45) Date of Patent: Sep. 29, 2020

(54) METHODS AND SYSTEMS FOR PROVIDING A GLOBAL STATEMENT

(71) Applicant: Citibank, N.A., New York, NY (US)

(72) Inventors: Lisa Davis, New York, NY (US); Padma Santhanam, Fair Lawn, NJ (US); Tim Schuman, Kenmore, NY (US); Srinivas Kunigal, Hillsborough, NJ (US); Nikhil Shah, Yardley, PA (US); Kapil Khurana, Roseland, NJ (US); Suranjan Choudhury, Monmouth Junction, NJ (US)

(73) Assignee: CITIBANK, N.A., New York, NY (US)

( * ) Notice: Subject to any disclaimer, the term of this patent is extended or adjusted under 35 U.S.C. 154(b) by 1198 days.

(21) Appl. No.: 13/924,138

(22) Filed: Jun. 21, 2013

(51) Int. Cl.
*G06Q 40/00* (2012.01)

(52) U.S. Cl.
CPC .................... *G06Q 40/10* (2013.01)

(58) Field of Classification Search
CPC ....................................................... G06Q 40/10
USPC ............................................................ 705/30
See application file for complete search history.

(56) References Cited

U.S. PATENT DOCUMENTS

| 8,311,911 | B2 | 11/2012 | Tsagarakis et al. | |
|---|---|---|---|---|
| 8,332,293 | B2 | 12/2012 | Rosenberger | |
| 2002/0123919 | A1* | 9/2002 | Brockman | G06Q 30/02 379/112.06 |
| 2003/0128828 | A1* | 7/2003 | Clark | H04M 15/00 379/116 |
| 2007/0043639 | A1 | 2/2007 | Tabs et al. | |
| 2007/0182990 | A1* | 8/2007 | Stephen | G06F 17/227 715/234 |
| 2008/0294551 | A1 | 11/2008 | Degenhart et al. | |
| 2009/0089193 | A1 | 4/2009 | Paintin | |
| 2010/0312687 | A1 | 12/2010 | Yeung | |
| 2010/0312697 | A1 | 12/2010 | Fracchia et al. | |
| 2011/0060668 | A1 | 3/2011 | Heim et al. | |
| 2011/0071941 | A1 | 3/2011 | Marcaide | |
| 2011/0191216 | A1 | 8/2011 | Foster | |
| 2012/0197759 | A1 | 8/2012 | Neely | |

(Continued)

FOREIGN PATENT DOCUMENTS

WO    WO 2008/130174 A1    10/2008

OTHER PUBLICATIONS

IP.Com et al., "Allocating Inventory Ownership to Multiple Legal Entities from an Existing Integrated Supply Chain & Manufacturing Single Plant System," IPCOM000185307D, Jul. 20, 2009, pp. 1-5.

(Continued)

*Primary Examiner* — A. Hunter Wilder
(74) *Attorney, Agent, or Firm* — Johnson, Marcou, Isaacs & Nix, LLC; George Marcou; Scott Hendrix (57) ABSTRACT

Methods and systems for providing global consolidated statement involve, for example, collecting, using a processor coupled to memory, customer account data from billing systems for each of a plurality of accounts of a plurality of business units of an entity. Likewise using the processor, the customer account data is collated across the plurality of accounts of the plurality of business units. Also using the processor, a single consolidated customer account statement is generated showing the collated customer account data across the plurality of accounts of the plurality of business units.

17 Claims, 4 Drawing Sheets

(56) References Cited

U.S. PATENT DOCUMENTS

| | | | | |
|---|---|---|---|---|
| 2012/0311449 A1* | 12/2012 | Harding | ............... | G06Q 10/00 |
| | | | | 715/730 |
| 2013/0006673 A1 | 1/2013 | Hurston et al. | | |
| 2013/0013497 A1 | 1/2013 | Ayala et al. | | |
| 2013/0024429 A1 | 1/2013 | Raas | | |
| 2013/0031002 A1 | 1/2013 | Hibbard | | |
| 2014/0012706 A1* | 1/2014 | Foerster | ............... | G06Q 30/04 |
| | | | | 705/26.81 |

OTHER PUBLICATIONS

Hong, G. "Electronic Bill of Lading's Title Transfer in International E-Commerce," BCGIN, IEEE $2^{nd}$ International Conference on Oct. 12-14, 2012, pp. 354-356.

* cited by examiner

METHODS AND SYSTEMS FOR PROVIDING A GLOBAL STATEMENT

FIELD OF THE INVENTION

The present invention relates generally to the field of electronic information management, and more particularly to methods and systems for providing a global statement showing consolidated account information across regions for an entity and selected ones of its related entities.

BACKGROUND OF THE INVENTION

Currently, when a financial institution customer requests a global financial institution, such as a global bank, to furnish it a single statement showing cross-branch or cross-regional spending details, fulfilling the request may be problematic for the financial institution. For example, the customer may have opened multiple accounts with the financial institution across many or all regions of the world including, for example, Asia, Europe, the Middle East, Africa, Latin America, and North America. The customer may want to see all of the fees and charges for which the financial institution has billed the customer in a single consolidated file.

In responding to a request for such information in the past, the financial institution may have manually retrieved the information from each of multiple financial institution branches around the world in the form of multiple account statements and likewise manually attempted to collate the retrieved information. That manual process was an extremely laborious and difficult undertaking.

There is a present need for methods and systems for providing a global statement that resolves all of the foregoing issues and eliminates the current necessity of financial institution personnel performing the laborious process of collecting account information individually from each of the financial institution's branches and then attempting to compile the information for its customers.

SUMMARY OF THE INVENTION

Embodiments of the invention employ computer hardware and software, including, without limitation, one or more processors coupled to memory and non-transitory, computer-readable storage media with one or more executable computer application programs stored thereon which instruct the processors to perform the methods and systems for providing a global statement described herein.

Embodiments of the invention provide methods and systems for providing a consolidated global account statement for a customer that involves, for example, collecting, using a processor coupled to memory, customer account data from billing systems for each of a plurality of accounts of a plurality of business units of an entity; collating, using the processor, the customer account data across the plurality of accounts of the plurality of business units; and generating, using the processor, a single consolidated customer account statement showing the collated customer account data across the plurality of accounts of the plurality of business units.

In aspects of embodiments of the invention, collecting the customer account data may involve, for example, collecting the customer account data after invoices related to the customer account data are sent to the customer from the billing systems. In other aspects, collecting the customer account data may involve, for example aggregating the customer account data into a single global data warehouse via a plurality of regional data warehouses. In further aspects, aggregating the customer account data into the single global data warehouse via the plurality of regional data warehouses may involve, for example, collecting the customer account data from the billing systems into the plurality of regional data warehouses. In additional aspects, aggregating the customer account data into a single global data warehouse may involve, for example, storing the collected customer account data in one or more data marts. In still other aspects, storing the collected customer account data in one or more data marts may involve, for example, storing the customer account data according to a hierarchy of parent and child identifiers for the customer.

In further aspects of embodiments of the invention, collating the customer account data may involve, for example, collating the customer account data according to characteristics of charges in the customer account data. In other aspects, collating the customer account data according to characteristics of charges in the customer account data may involve, for example, linking charges in the customer account data according to corresponding charge codes across the billing systems. In still further aspects, collating the customer account data according to characteristics of charges in the customer account data may involve, for example, linking the charges in the customer account data according to corresponding product hierarchy levels related to the charges across the billing systems. In still other aspects, linking the charges in the customer account data according to corresponding product hierarchy levels may involve, for example, maintaining a profile and product hierarchy for the customer at a global statement construct user interface of a global billing system. In additional aspects, maintaining the profile and a product hierarchy for the customer at the global statement construct user interface may involve, for example, creating, using the global statement construct user interface, a reporting construct in the global billing system.

In additional aspects of embodiments of the invention, generating the single consolidated customer account statement may involve, for example, exchanging information related to the customer account data between a global data warehouse storing the customer account data and a global billing system. In further aspects, exchanging the information related to the customer account data may involve, for example, exchanging the information in response to receiving a request for the consolidated customer account statement for the customer. In other aspects, receiving the request for the consolidated account statement may involve, for example, receiving the request for the consolidated account statement at a customer's parent identifier level for all children identifiers under the customer's parent identifier. In still other aspects, receiving the request for the consolidated account statement may involve, for example, receiving the request for the global statement at a child identifier level for the customer. In still further aspects, exchanging the information related to the customer account data may involve, for example, populating all associated charge data from all product processors for requested accounts stored in a data mart.

In other aspects of embodiments of the invention, exchanging the information related to the customer account data may involve, for example, sending by the global billing system a request periodically to the global information warehouse with a customer's global finance parent identifier and one or more child identifiers for the customer. In additional aspects, exchanging the information related to the customer account data may involve, for example, returning customer account data associated with a requested parent identifier and one or more child identifiers of a customer from a central information file. In further aspects, exchanging the information related to the customer account data may involve, for example, creating a global statement for a financial institution customer with a summary of the customer's full cash management activities globally consisting at least in part of transaction volume, fees, and account balances. In still other aspects, generating the single consolidated customer account statement may involve, for example, creating the consolidated statement in a customer-specific language from the information stored in a data mart in a customer-specific language. In still further aspects, generating the single consolidated customer account statement may involve, for example, generating the statement using customer account information in a reporting construct and corresponding data in a data mart. Further aspects may involve, for example, presenting the single consolidated customer account statement for the customer via a push mechanism or a pull mechanism.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention utilize one or more special purpose computer software application program processes, each of which is tangibly embodied in a physical storage device executable on one or more physical computer hardware machines, and each of which is executing on one or more of the physical computer hardware machines (each, a "computer program software application process"). Physical computer hardware machines employed in embodiments of the invention comprise, for example, input/output devices, motherboards, processors, logic circuits, memory, data storage, hard drives, network connections, monitors, and power supplies. Such physical computer hardware machines include, for example, user machines and server machines that may be coupled to one another via a network, such as a local area network, a wide area network, or a global network through telecommunications channels which may include wired or wireless devices and systems.

Embodiments of the invention provide a global statement for a financial institution customer with a summary of the customer's full cash management activities globally, including, for example, transaction volume, fees, and account balances. The solution provided by embodiments of the invention for customers of a global financial institution may involve, for example, collecting the customer's information automatically from billing systems of different branches of the financial institution, storing the collected information into a centralized data warehouse or database, and logically arranging the stored information in such a way that a final product in the form of a global statement includes, for example, a summary of the customer's billing information grouped under a code product category.

Further simplifying the process, the global statement for embodiments of the invention may provide additional details in the same file in an additional tab that gives service activity details. In addition, the process for embodiments of the invention may provide the customer an additional sheet to show the closing balances of the customer's accounts. Thus, embodiments of the invention resolve the currently existing account information collection and collation problems by providing customers a consolidated global statement.

It is to be understood that the consolidated global statement for embodiments of the invention provides customers information, for example, for analytical purposes only and is distinct from customer invoices, which are bills setting forth the sums due from a customer. Customer invoices are sent to customers separately, for example, by global financial bank branches as required by branch legal requirements. Thus, the global statement for embodiments of the invention is provided, for example, for analyses after invoices have been sent to customers by various branches of the global bank and can be used for analyses and trending or other ways in which the customer may want to learn more about its billing information.

Figure 1:
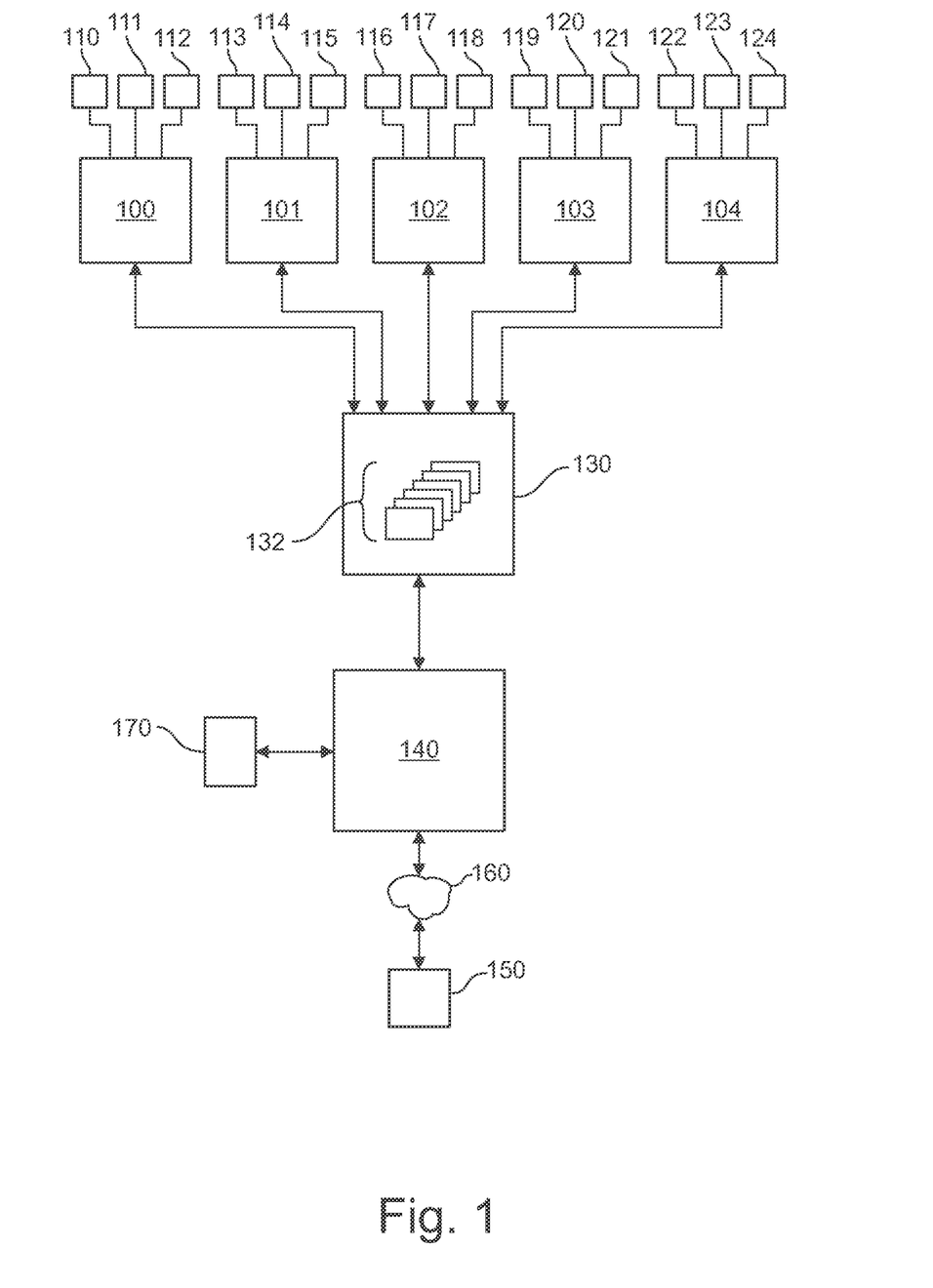
FIG. 1 is a schematic diagram that illustrates an overview example of key components employed in the systems and methods for embodiments of the invention and the flow of information between such components.

Embodiments of the invention may employ multiple components and systems, for example, of the global financial institution. FIG. 1 is a schematic diagram that illustrates an overview example of key components employed in the systems and methods for embodiments of the invention and the flow of information between such components. Referring to FIG. 1, in aspects of embodiments of the invention, such components may include, for example, regional data warehouses or databases 100-104. In such aspect, an information or data warehouse may be provided for each global region, and information for various branch billing systems 110-124 of the financial institution may be collected for each region and placed in the regional data warehouse of that region.

For example, referring further to FIG. 1, information for various branch billing systems 110-124 of the financial institution may be collected for a particular region 110 may be placed in the regional data warehouse 100 of that region Thus, embodiments of the invention may employ a separate regional information warehouse, for example, in each of Asia, Europe, the Middle East, Africa, Latin America, and North America. In addition, each regional information warehouse 100-104 may communicate with a global information warehouse 130 of the financial institution. The global information warehouse 130 may collect customers' account information from all of the regional information warehouses 100-104 and store the information in a data mart 132. Thereafter, embodiments of the invention involve, for example, creating a global statement from the information stored in the data mart 132 in such a way that the information in the global statement is readable and decipherable to a client-specific language.

Referring again to FIG. 1, creating the global statement of the system for embodiments of the invention may involve, for example, a global billing system 140 of the financial institution. The global billing system 140 may have a powerful engine that maintains customer profiles, product hierarchies, and account information. Embodiments of the invention may involve a unique exchange of information between the global information warehouse 130 and the global billing system 140. In such exchange, the information gathered from the regional information warehouses 100-104 may be grouped logically and presented in a readable format for the billing activities of a particular billing cycle in the form of a global statement so that a customer may have a logical way of reading the billing details for all of the customer's accounts.

Referring further to FIG. 1, embodiments of the invention may employ different modes of delivering the global statement, such as secured email ID in which the information is transmitted to a customer's email ID via a secure email channel to a customer's computing device 150. In the secured email ID mode the financial information may collect the intended recipient's email ID and send it through a secure email channel to the customer's computing device 150 with its privacy protected. Another delivery mode may involve, for example, a self-service extraction method in which the global statement may be lodged on an online banking platform 160 for access by the customer via the customer's computing device 150. In the self-service extraction mode, customers may authorize and designate authorized persons to extract the global statements through a self-service mechanism.

Referring once more to FIG. 1, in the collection aspect of embodiments of the invention customers' data is automatically collected from billing systems 110-124 of different branches of the global financial institution. In the collection aspect, all billing information for a particular region may be sent it to a regional data warehouse 100-104, respectively, for the region. Thereafter, all of the collected data may be aggregated into a global information warehouse 130. In a collation aspect of embodiments of the invention, the financial institution's global billing system 140 and global information warehouse 130 may exchange information to the extent that is necessary to respond to a customer's request for a global statement. Such exchange of information may be referred to as a subscription feed exchange. In embodiments of the invention, a subscription process identifies the accounts that are needed to be part of the global statement, and the global information warehouse 130 selects the billing details of the subscribed accounts and publishes those details in the global statement. As previously described, a delivery aspect of embodiments of the invention may involve, for example, the self-service extraction through an online banking platform 160 of the financial institution or a push mechanism in which the financial institution may send the global statement to a customer's computing device 150 via a secured email.

Figure 2:
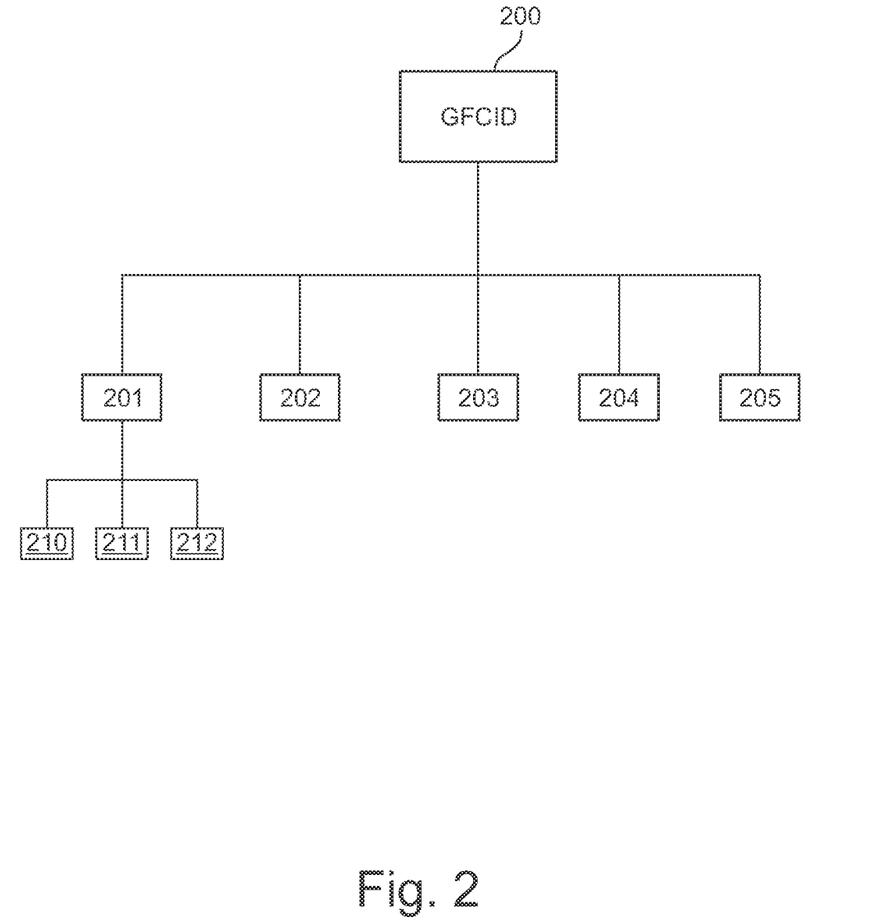
FIG. 2 is a chart that illustrates an example of the hierarchy aspect for embodiments of the invention.

In a hierarchy aspect for embodiments of the invention a global financial parent identifier (GFPID) and a global finance child identifier (GFCID), respectively, are internal identifiers that may be assigned by the global financial institution, for example, for each corporate customer of the financial institution and each of its subsidiaries. FIG. 2 is a chart that illustrates an example of the hierarchy aspect for embodiments of the invention. A particular company that is assigned parent identifier 200 may have hundreds of accounts opened within the global financial institution under different branches of the financial institution in various regions of the world. Each of those hundreds of accounts may be tagged with a child ID 201-205, and each of those child accounts may in turn have multiple child accounts below it, each of which may also be tagged with a child ID 210-212.

Thus, the parent ID 200 is at the top level, and the parent ID may have multiple child ID's 201-205 or a family of child ID's. In other words, parent ID's may have multiple children ID's, and the multiple children ID's may in turn have multiple children ID's, such as child ID's 210-212 assigned to one or accounts for multiple children of their own. A feature of the hierarchy aspect for embodiments of the invention may enable a customer to request a global statement, for example, at a parent ID level for all children ID's under the particular customer's parent ID. In addition, the customer may request the global statement at a particular child ID level.

In embodiments of the invention, a customer profile, product hierarchy and entity are maintained at a construct user interface 170, as shown in FIG. 1, for the global billing system. Thus, the global billing system user interface 170 is an entry to a portal maintained by the financial institution for a particular statement construct. Assume, for example, that in a particular month, a customer asks about fifteen of the customer's accounts and in a succeeding month the customer reports that it has closed three of those accounts and thus does not need information for those three closed accounts. The financial institution may employ the user interface 170 for the global billing system to remove the three accounts from the global billing statement. Thus, the user interface 170 may be used, for example, to tailor the nature of the global statement.

Figure 3:
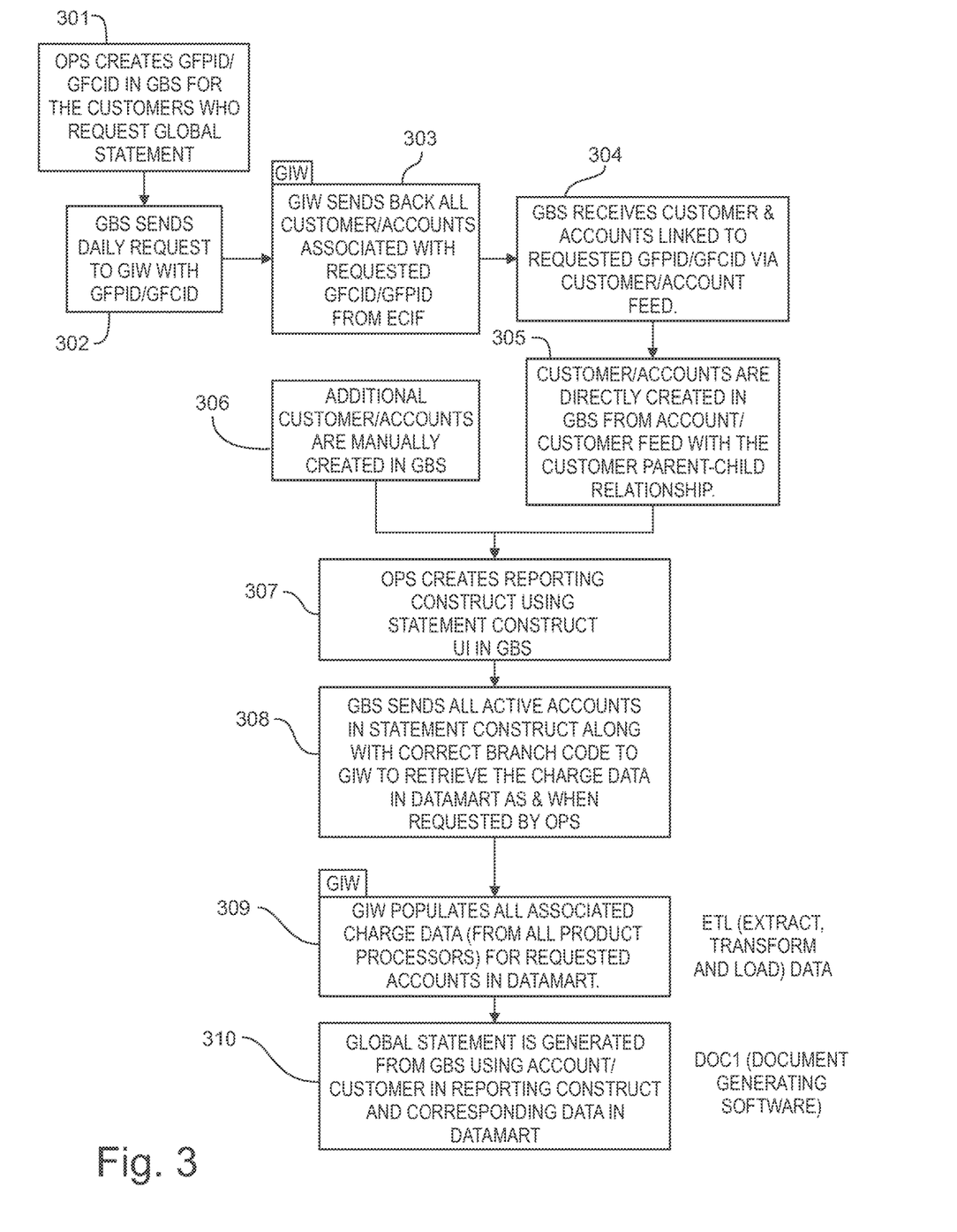
FIG. 3 is a schematic flow chart that illustrates an example of the process of generating a global statement for embodiments of the invention.

FIG. 3 is a schematic flow chart that illustrates an example of the process of generating a global statement for embodiments of the invention. Referring to FIG. 3, at 301, authorized personnel of the financial institution, referred to as operations, may create internal financial institution identifiers, such as parent ID 200, for financial institution customers in the financial institution global billing system 140 for customers which request a global statement. In addition, operations may also create child identifiers, such as child IDs 201-205, for the subsidiaries of those customers in the global billing system 140.

Referring also to FIG. 3, at 302, the global billing system 140 may send a request periodically, such as daily, to the global information warehouse 130 with a customer's parent identifier and one or more child identifiers for the customer. At 303, the global information warehouse 130 may send back to the global billing system 140 all customer account information associated with the requested customer's parent identifier and child identifier or identifiers from a central information file (eCif).

Referring further to FIG. 3, at 304, the global billing system 140 may receive the customer account information linked to the requested customer's parent identifier and child identifier or identifiers via a customer account information feed, and at 305, may directly create customer accounts from the account information feed based on the customer's parent-child relationship(s). At 306, additional customer accounts may be manually created in the global billing system 140 if needed. At 307, operations (e.g., authorized financial institution personnel) may create a reporting construct using a statement construct user interface 170 in the financial institution global billing system 140 as shown in FIG. 1.

In embodiments of the invention, an information exchange may occur when the feeds come back for the global statement at 304 as shown in FIG. 3. Referring once more to FIG. 3, at 308, the global billing system 140 may send all active accounts in the statement construct along with a correct branch code to the global information warehouse 130 to retrieve charge data in the data mart 132 as and when requested by operations. As previously noted, the global information warehouse collects the charge data from the regional warehouses and places it in the data mart 132.

Referring once again to FIG. 3, at 309, the global information warehouse 130 may populate all associated charge data from all product processors for the requested accounts in the data mart 132. The data mart 132, which may be characterized as a particular table or tables in the global information warehouse 130, may send the required information for a particular global statement for the branch codes and customer's accounts that are identified in the request that is received from the global billing system 140. The data that is received by the global data warehouse 130 is compartmentalized so the global statement may be delivered in a particular fashion.

Referring still again to FIG. 3, at 310, a global statement may be generated from the global billing system using customer account information in the reporting construct and corresponding data in the data mart 132. It is noted that all items that are alike go into a particular data mart 132, so that a report can be created based on only the information that is needed from the global information warehouse 130. Thus, all information for a particular purpose may be separated and put into a single data mart 132. That information may then go into the global billing system 140, so that everything that arrives at the global information warehouse 130 may not be needed for a particular global statement. Thus, what is pulled into the data mart 132 may be limited to billing-related data, which is the data that is presented on the global statement. As previously indicated, delivery of the global statement may be by self-service extraction through an online banking platform or a push mechanism via secured email.

Figure 4:
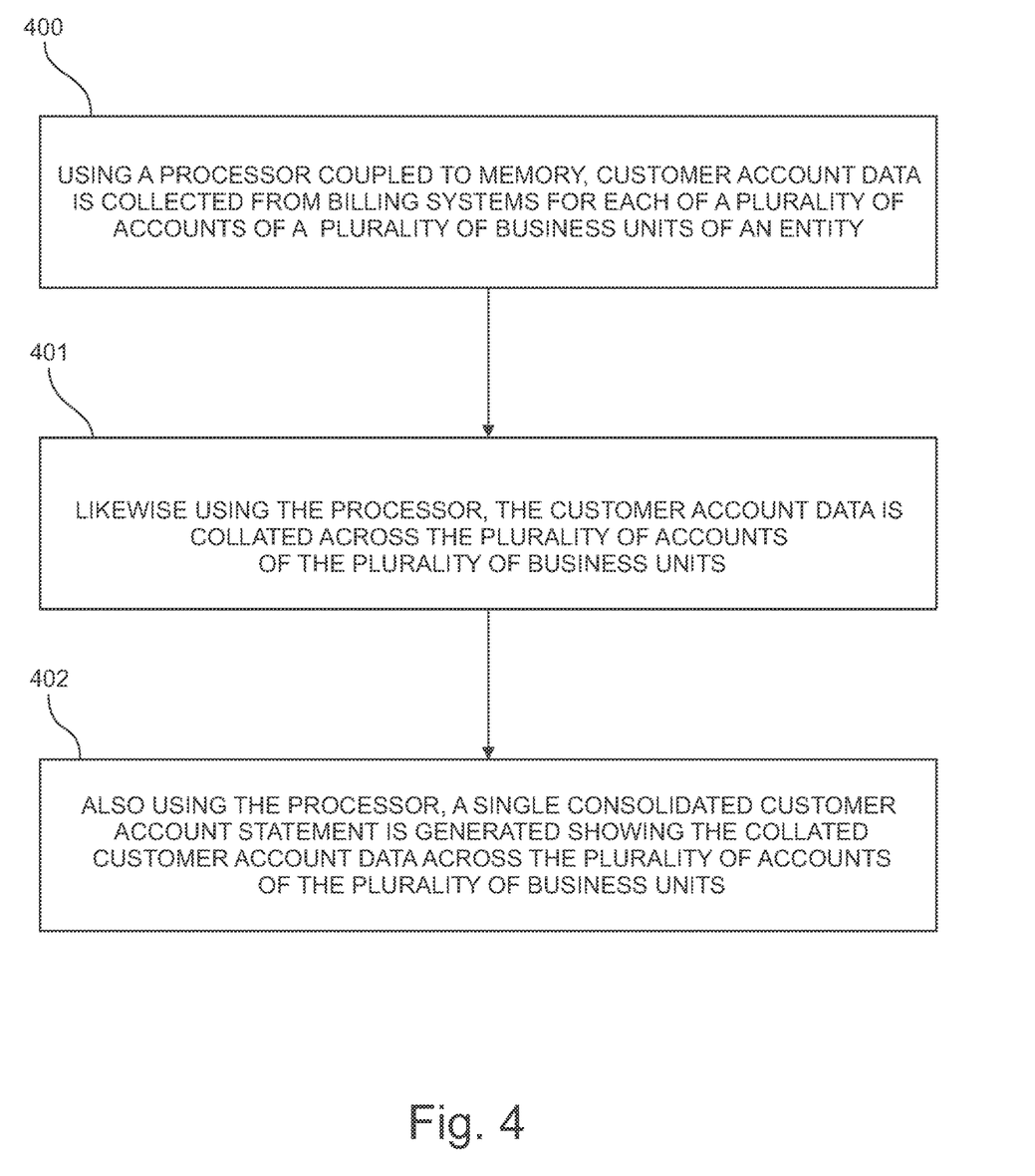
FIG. 4 is a flow chart that illustrates another example of the process of generating a global statement for embodiments of the invention.

FIG. 4 is a flow chart that illustrates another example of the process of generating a global statement for embodiments of the invention. Referring to FIG. 4, at 400, using a processor coupled to memory, customer account data is collected from billing systems for each of a plurality of accounts of a plurality of business units of an entity. At 401, likewise using the processor, the customer account data is collated across the plurality of accounts of the plurality of business units. At 402, also using the processor, a single consolidated customer account statement is generated showing the collated customer account data across the plurality of accounts of the plurality of business units.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a Wide Area Network (WAN), a Local Area Network (LAN), a cellular network, or any other suitable network. Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A method, comprising:
   automatically collecting, by a global data warehouse server processor and on a scheduled, periodic basis, post-billing customer account data from each of a plurality of regional data warehouse servers for each of a plurality of accounts of a plurality of business units of an entity in a plurality of different countries into a single subset of the global data warehouse server processor according to a hierarchy of a unique subsidiary identifier for each business unit of the entity linked to a unique identifier for the entity;
   automatically logically arranging, by a global billing server processor coupled to the global data warehouse server processor, data representing charges in the post-billing customer account data for the plurality of business units of the entity in the plurality of different countries to corresponding unique subsidiary identifiers for the plurality of business units of the entity in the plurality of different countries according to the hierarchy of the unique subsidiary identifier for each business unit of the entity linked to the unique identifier for the entity and based upon charge codes according to characteristics of charges in the post-billing customer account data and according to corresponding product hierarchy levels related to the charges across each of the plurality of billing units of the entity in the plurality of different countries;

automatically creating, by the global billing server processor, a customer profile and product hierarchy in a readable format in a client-specific language for the plurality of business units of the entity in the plurality of different countries as a reporting construct at a global statement construct user interface as a portal for the reporting construct;

automatically compartmentalizing, by the global billing server processor, the post-billing customer account data such that the reporting construct is deliverable in a particular format;

receiving, by the global billing server processor, a request for a single consolidated post-billing customer account statement associated with unique subsidiary identifiers associated with a particular customer;

automatically placing, by the global billing server processor, particular portions of the data associated with unique subsidiary identifiers into a single data set;

automatically generating, by the global billing server processor, the single consolidated post-billing customer account statement in a customer-specific language and populated with preselected post-billing customer account details for the plurality of business units of the entity corresponding to the unique subsidiary identifiers requested and placed in the single data set;

automatically delivering, by the global billing server processor, the single consolidated post-billing customer account statement to a requester via self-service extraction of the data via the global statement construct user interface; and automatically allowing, by the global billing server processor, via the global statement construct user interface, addition, removal, or alteration of at least one of the plurality of accounts of the plurality of business units of the entity in the plurality of different countries in the reporting construct.

2. The method of claim 1, wherein collecting the post-billing customer account data further comprises aggregating the post-billing customer account data into the global data warehouse server processor via the plurality of regional data warehouses servers.

3. The method of claim 2, wherein aggregating the post-billing customer account data into the global data warehouse server processor via the plurality of regional data warehouse servers further comprises collecting the post-billing customer account data from the each of a plurality of billing systems into the plurality of regional data warehouse servers.

4. The method of claim 2, wherein aggregating the post-billing customer account data into the global data warehouse server processor further comprises storing the collected post-billing customer account data in the single subset of the global data warehouse server processor.

5. The method of claim 4, wherein storing the collected post-billing customer account data in the single subset of the global data warehouse server processor further comprises storing the post-billing customer account data according to a hierarchy of the unique subsidiary identifier for each business unit of the entity linked to a unique identifier for the entity.

6. The method of claim 1, further comprising collating the post-billing customer account data according to the characteristics of charges in the post-billing customer account data.

7. The method of claim 1, further comprising exchanging information related to the post-billing customer account data between the global data warehouse server processor storing the post-billing customer account data and a global billing system in response to receiving a request for the consolidated post-billing customer account statement for the entity.

8. The method of claim 7, wherein receiving the request for the consolidated account statement further comprises receiving the request for the consolidated post-billing account statement at a subsidiary identifier level for all subsidiary identifiers under an entity identifier.

9. The method of claim 7, wherein receiving the request for the consolidated post-billing account statement further comprises receiving the request for the global statement at a subsidiary identifier level for the entity.

10. The method of claim 7, wherein exchanging the information related to the post-billing customer account data further comprises populating all associated post-billing charge data from all product processors for requested accounts stored in a single subset of the global data warehouse server processor.

11. The method of claim 1, wherein exchanging the information related to the post-billing customer account data further comprises sending by a global billing system a request periodically to the global information warehouse server processor with an entity identifier and one or more subsidiary identifiers for the entity.

12. The method of claim 11, wherein exchanging the information related to the post-billing customer account data further comprises returning post-billing customer account data associated with a requested entity identifier and one or more subsidiary identifiers of the entity from a central information file.

13. The method of claim 1, wherein exchanging the information related to the post-billing customer account data further comprises creating a global statement for the entity with a summary of full post-billing cash management activities globally associated with the entity consisting at least in part of transaction volume, fees, and account balances.

14. The method of claim 1, wherein generating the single consolidated post-billing customer account statement further comprises creating the consolidated statement in the customer-specific language from the information stored in a the single subset of the global data warehouse server processor in the customer-specific language.

15. The method of claim 1, wherein generating the single consolidated post-billing customer account statement further comprises generating the statement using post-billing customer account information in a reporting construct and corresponding data in the single subset of the global data warehouse server processor.

16. The method of claim 1, further comprising presenting the single consolidated post-billing customer account statement for the entity via a push mechanism or a pull mechanism.

17. A system, comprising:
a global data warehouse server processor programmed to:
automatically collect post-billing customer account data from each of a plurality of regional data warehouse servers for each of a plurality of accounts of a plurality of business units of an entity in a plurality of different countries into a single subset of the global data warehouse server processor according to a hierarchy of a unique subsidiary identifier for each business unit of the entity linked to a unique identifier for the entity; and a global billing server processor coupled to the global data warehouse processor and programmed to:
automatically logically arrange data representing charges in the post-billing customer account data for the plurality of business units of the entity in the plurality of different countries to corresponding unique subsidiary identifiers for the plurality of business units of the entity in the plurality of different countries according to the hierarchy of the unique subsidiary identifier for each business unit of the entity linked to the unique identifier for the entity and based upon charge codes according to characteristics of charges in the post-billing customer account data and according to corresponding product hierarchy levels related to the charges across each of the plurality of billing units of the entity in the plurality of different countries;

automatically create a customer profile and product hierarchy in a readable format in a client-specific language for the plurality of business units of the entity in the plurality of different countries as a reporting construct at a global statement construct user interface as a portal for the reporting construct;

receive a request for a single consolidated post-billing customer account statement associated with unique subsidiary identifiers associated with a particular customer;

automatically place particular portions of the data associated with unique subsidiary identifiers into a single data set;

automatically generate the single consolidated post-billing customer account statement in a customer-specific language and populated with preselected post-billing customer account details for the plurality of business units of the entity corresponding to the unique subsidiary identifiers requested and placed in the single data set;

automatically deliver the single consolidated post-billing customer account statement to a requester via self-service extraction of the data via the global statement construct user interface;

and automatically allow, via the global statement construct user interface, addition or removal of at least one of the plurality of accounts of the plurality of business units of the entity in the plurality of different countries in the reporting construct.

* * * * *